March 25, 1969 — E. J. BROWN ET AL — 3,434,940

PROCESS FOR MAKING THIN-FILM TEMPERATURE SENSORS

Filed July 21, 1966

*INVENTORS*
EARL J. BROWN
JAMES R. CROWDER
RAYMOND O. KARL

BY *Gravely, Lieder & Woodruff*
ATTORNEYS

United States Patent Office 3,434,940
Patented Mar. 25, 1969

3,434,940
PROCESS FOR MAKING THIN-FILM
TEMPERATURE SENSORS
Earl J. Brown, St. Louis County, James R. Crowder, St.
Ann, and Raymond O. Karl, O'Fallon, Mo., assignors
to McDonnell Douglas Corporation, St. Louis, Mo.
Filed July 21, 1966, Ser. No. 566,986
Int. Cl. H05k 3/28, 1/08; C23b 5/50
U.S. Cl. 204—15                      8 Claims The present invention pertains to a new and improved process for making thin-film temperature sensors.

Heretofore temperature sensors have consisted of the usual thermocouples which require a reference of wire wound resistance elements which are bulky. Such prior sensors are large and have slow reactions, and there is the further objection that they are expensive. There is, therefore, a need for a cheap sensor that has an extremely fast response and which may be used in a variety of configurations.

It is an object of the present invention to provide a new improved process by means of which a thin-film temperature sensor may be manufactured at low cost.

Another object of the present invention is to provide a process of making an extremely fast and sensitive temperature sensor that has greatly reduced bulk to extend uses thereof to different configurations.

Still another object of the present invention is to provide a temperature sensor element as a thermal resistor which has the advantage of not requiring a reference such as is required for thermocouples.

The foregoing and other features of this invention which are believed to be new are set forth with particularity in the following specification and claims, reference being made to the accompanying drawings, wherein:

In one form of the invention the method or process includes the steps of preparing a non-conductive base or substrate with a surface coating that can be etched to the shape of the sensor, depositing a suitable adhesive material, at least in the etched shape of the sensor, to a predetermined thickness, depositing the thermal resistor material such as a nickel-iron alloy to a predetermined thickness, depositing a noble metal such as gold, platinum or paladium in position as the leads, and then passivating the nickel-iron alloy with a suitable material.

Figure 1:
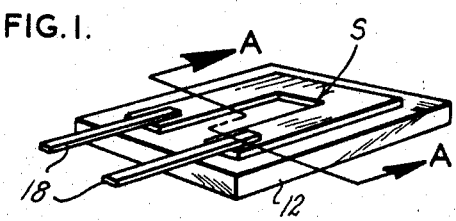
FIG. 1 is a perspective view of one form which the temperature sensor may have for purpose of illustration.
Figure 2:
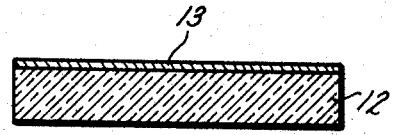
FIGS. 2 to 9 are fragmentary sectional views in progressive order of the steps in the process of manufacture of the sensor shown in FIG. 1, the views being taken at section A—A.
Figure 3:
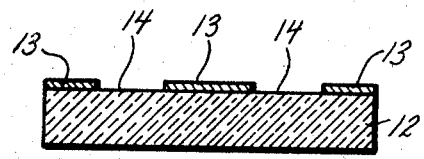
Figure 4:
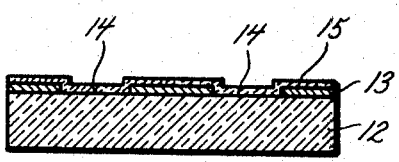
Figure 5:
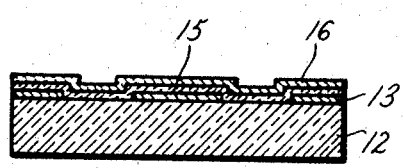
Figure 6:
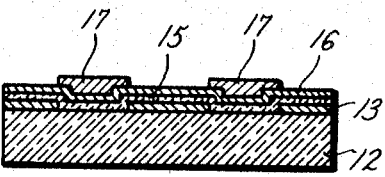

Referring now to FIG. 1 which is the product of the process illustrated in FIGS. 2 through 9, there is shown a substrate 12 which may be a non-conductive or non-metallic base such as glass. One surface of the substrate 12 is coated with a metal that can be chemically etched without also etching a nickel-iron alloy. It is found that such a coating material 13 can be aluminum. The substrate 12 is coated with aluminum to a thickness of from 1000 to 2000 angstroms by vacuum deposition apparatus. The thus coated substrate is coated with thin film resist (KTFR) and centrifuged at approximately 800 r.p.m. for a period of about fifteen seconds. The film resist is then baked in a circulating air oven at 90° C. for a period of three minutes, after which it is exposed for about one and one-fourth minutes through a photographic mask which has the configuration of the ultimate sensor desired.

The thus baked and exposed film resist (KTFR) is developed for two minutes in a suitable developer, after which it is rinsed and degreased before being baked at 90° C. for thirty minutes in the air oven.

The above treated substrate 12 with the aluminum coating 13 is then subjected (FIG. 3) to immersion in a 10% solution of sodium hydroxide which etches the aluminum coating away in the temperature sensor configuration area. The etching removes the aluminum down to the substrate in the areas 14 and then is thoroughly rinsed in water before being immersed in a solution of Stripper 99 and scrubbed to remove the KTFR resist. Several rinsings in warm (tap) water and alcohol spray are followed by agitated washing in a solution of (two tablespoons of alconox per gallon of high purity water) detergent. This is followed by high purity water rinse and alcohol rinse, after which the substrate is degreased in alcohol vapor.

At this point in the process a premelted nickel-iron alloy of approximately a 70–30 composition is placed in a four position rotatable water cooled crucible, and a premelted refractory metal such as tantalum is placed in another position of the rotatable crucible. The crucible is placed in a position such that an electron beam will strike the refractory metal which is first deposited on the substrate as prepared in FIG. 3. The substrate is placed in a holder in a vacuum system and the vacuum pump is started and when the pressure reaches $5 \times 10^{-5}$ torr, the heater is turned on. The substrate temperature is brought up to about 300° C. and a pressure of $9 \times 10^{-7}$ torr at which conditions the electron beam power is turned on to start the refractory metal evaporation. This deposition continues until a monitor resistance device shows the presence of 5000 ohms per square of refractory metal. The substrate has now reached the condition of FIG. 4 where a layer or coating 15 of a refractory metal is present over the aluminum coating 13 and the sensor voids 14.

The next steps of the process call for rotating the crucible to position the nickel-iron for evaporation by the electron beam device. Such vacuum deposition of nickel-iron continues until the monitor device reaches the desired predetermined ohm per square resistivity. In the example shown in FIG. 5, the thickness of the nickel-iron deposit 16 is approximately thirty ohms per square. The vacuum system is then cooled to about 60° C. before it is vented to atmosphere and the treated substrate removed.

There then follows in the process the application of KTFR resist to the entire surface of the nickel-iron deposit 16 and a spinning step at about 800 r.p.m. for 15 seconds. There then follows the steps of a three minute bake at 90° C. in the air oven, an exposure of the KFTR resist for one and one-fourth minutes in the area corresponding to the resistance unit configuration desired, immersion in a developer for two minutes, and removal of the developer in warm (tap) water followed with an alcohol rinse and alcohol degreaser. The substrate is then baked for thirty minutes at 90° C. in the air oven after which it is immersed in a gold strike plating solution. The gold plating 17 over the nickel-iron is performed at 30 mililamps for fifteen seconds and is followed by application of a suitable gold plating solution at 10 milliamps for thirty seconds. The substrate is then rinsed in warm (tap) water and dried, after which the KTFR resist is removed in trichlor-ethylene resulting in the unit of FIG. 6.

Figure 7:
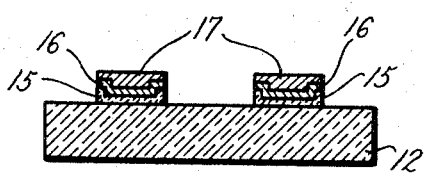
Figure 8:
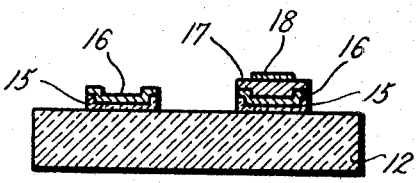
Figure 9:
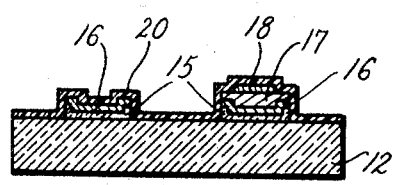

The unwanted areas of the materials which have been deposited on the substrate 12 may now be removed with a solution of 10% sodium hydroxide heated to 50° C. The unit of FIG. 7 is the result of this step. At this stage gold ribbon leads 18 of proper length are attached (FIG. 8) to suitable bonding pads by resistance gap welding. The unit is now ready for the deposit of silicon monoxide 20 of about 10,000 angstroms over the entire surface, as shown in FIG. 9.

Figure 10:
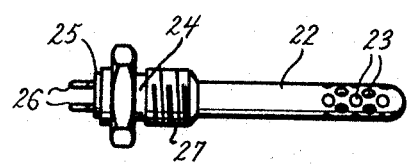
FIG. 10 is a side view of a possible configuration for using the improved sensor as a temperature transducer.
Figure 11:
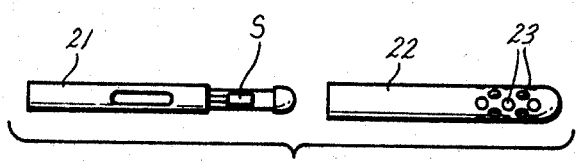
FIG. 11 is an exploded view of certain parts only of the temperature transducer seen in FIG. 10.

The thin film resistor produced in the process above described may be used as a basic element for making temperature transducers in a variety of configurations. One such configuration is shown in FIGS. 10 and 11, and includes an insulating insert 21 which supports a sensor S in a housing 22 adjacent the perforations 23 near the outer end of the housing. The housing 22 is mounted in a sealed base 24, and a suitable insert 25 for the base supports the leads 26. The base 24 may be formed with a threaded extension 27 by which the transducer is suitably mounted.

The invention herein described provides a simplified process for making a thin-film resistance unit or temperature sensor on a substrate and the unwanted materials are removed in a simple manner without affecting the sensor. While a particular embodiment of the process has been shown and described, modification may be made in one or more of the steps and various equipment may be used in place of that suggested herein. However, it is intended that all such modifications shall be included within the scope of the appended claims.

What is claimed is:
1. A process for making a thin-film sensor element which comprises the following steps: depositing an etchable metallic layer onto an electrically and chemically inert substrate; removing an area of the metallic layer corresponding to the shape of the sensor element to be made; applying a layer of an adhesive material over the shaped area on the substrate; depositing a thin-film layer of a nickel-iron alloy into the shaped area and upon the layer of adhesive material; selectively plating a noble metal on the nickel-iron alloy layer to define conductors; and removing unwanted portions of the etchable metallic layer, adhesive material and nickel-iron alloy layer and passivating the complete assembly.

2. The process set forth in claim 1 wherein said etchable metallic layer is aluminum, and said removal step applied to said metallic layer is a photo-resist step.

3. The process set forth in claim 1 wherein said layer of adhesive material consists of a refractory metal, and said noble metal is gold.

4. The process set forth in claim 1 including a passivating step which comprises vacuum deposition of silicon monoxide.

5. The process set forth in claim 1 wherein said layer of adhesive material is vacuum deposited to a thickness of approximately 5000 ohms per square at a temperature of about 300° C. and a pressure of about $9 \times 10^{-7}$ torr.

6. The process set forth in claim 5 wherein said layer of nickel-iron alloy is vacuum deposited to a thickness of approximately 30 ohms per square.

7. The process set forth in claim 6 wherein said selective plating of a noble metal is performed at substantially 30 milliamps for about 15 seconds, and is followed by a noble metal plating solution applied at approximately 10 milliamps for about 30 seconds.

8. The process set forth in claim 7 wherein said removal of unwanted portions of the metallic layer, adhesive material and nickel-iron alloy is accomplished with a solution of sodium hydroxide.

References Cited

UNITED STATES PATENTS

| 3,240,602 | 3/1966 | Johnston | 204—15 |
| 3,240,684 | 3/1966 | Martin et al. | 204—15 |
| 3,310,432 | 3/1967 | Griest et al. | 204—15 |
| 3,370,262 | 2/1968 | Marty et al. | 117—212 |
| 3,377,697 | 4/1968 | Hobbs | 117—212 |

ROBERT K. MIHALEK, Primary Examiner.

T. TUFARIELLO, Assistant Examiner.

U.S. Cl. X.R.

117—212; 29—626